United States Patent
Tasher et al.

(10) Patent No.: US 9,626,529 B2
(45) Date of Patent: Apr. 18, 2017

(54) SECURE DATA STORAGE DEVICE AND DATA WRITING AND READ METHODS THEREOF

(71) Applicant: WINBOND ELECTRONICS CORP., Taichung (TW)

(72) Inventors: Nir Tasher, Tel Mond (IL); Mark Luko, Herzliya (IL); Uri Kaluzhny, Beit Shemesh (IL)

(73) Assignee: Winbond Electronics Corp., Taichung (TW)

( * ) Notice: Subject to any disclaimer, the term of this patent is extended or adjusted under 35 U.S.C. 154(b) by 31 days.

(21) Appl. No.: 14/937,181

(22) Filed: Nov. 10, 2015

(65) Prior Publication Data

US 2016/0140356 A1 May 19, 2016

(30) Foreign Application Priority Data

Nov. 17, 2014 (IL) .......................................... 235729

(51) Int. Cl.
*G06F 21/62* (2013.01)
*G06F 12/14* (2006.01)
*G06F 3/06* (2006.01)

(52) U.S. Cl.
CPC ........ *G06F 21/6218* (2013.01); *G06F 3/0623* (2013.01); *G06F 3/0638* (2013.01); *G06F 3/0679* (2013.01); *G06F 12/1408* (2013.01); *G06F 12/1475* (2013.01); *G06F 2212/202* (2013.01)

(58) Field of Classification Search
CPC ............. G06F 12/1408; G06F 12/1475; G06F 21/6218; G06F 3/0638; G06F 3/0679; G06F 3/0623; G06F 2212/202
See application file for complete search history.

(56) References Cited

U.S. PATENT DOCUMENTS 5,276,738 A    1/1994 Hirsch
5,943,283 A *  8/1999 Wong .................. G06F 12/1408
                                                    365/221

(Continued)

FOREIGN PATENT DOCUMENTS

TW    200418047 A    9/2004
TW    200644560      12/2006

(Continued)

*Primary Examiner* — Mohammad A Siddiqi
(74) *Attorney, Agent, or Firm* — Muncy, Geissler, Olds & Lowe, P.C.

(57) ABSTRACT

A secure data storage device for preventing tampering with data stored thereon includes a two-dimensional memory array for storing data, the array includes a predetermined number of data words. Each data word includes a set of bits, and is associated with a single physical address in the memory array. A key storage area for storing a key of the data storage device is included in the device. The secure data storage device includes an address conversion unit configured to convert a logical address to a corresponding physical address which points to a location in the memory array. The device includes a bit mixing unit for mixing bit values of an input data word to obtain a mixed word value, such that the mixed word value is a rearrangement of the bit values of the input data word. The device is electrically connectable to a host.

14 Claims, 5 Drawing Sheets

(56) References Cited

U.S. PATENT DOCUMENTS

| | | | |
|---|---|---|---|
| 6,345,359 B1 | 2/2002 | Bianco | |
| 6,977,927 B1* | 12/2005 | Bates | G06F 3/0605 370/381 |
| 2003/0128841 A1* | 7/2003 | Ouyang | G06F 7/724 380/28 |
| 2004/0054878 A1 | 3/2004 | Debes et al. | |
| 2004/0091114 A1* | 5/2004 | Carter | G06F 21/606 380/259 |
| 2006/0109981 A1* | 5/2006 | Sexton | H04L 9/0631 380/28 |
| 2007/0192592 A1 | 8/2007 | Goettfert et al. | |
| 2010/0115286 A1 | 5/2010 | Hawkes et al. | |
| 2014/0248929 A1* | 9/2014 | Noonan | H04L 9/001 463/9 |
| 2015/0006486 A1* | 1/2015 | Lin | G06F 3/0604 707/634 |

FOREIGN PATENT DOCUMENTS

| | | |
|---|---|---|
| TW | 201346635 A | 11/2013 |
| WO | WO2012/047200 A1 | 4/2012 |

\* cited by examiner

SECURE DATA STORAGE DEVICE AND DATA WRITING AND READ METHODS THEREOF

CROSS REFERENCE TO RELATED APPLICATIONS

This application claims priority of IL Application No. 235729, filed on Nov. 17, 2014, the entirety of which is incorporated by reference herein.

BACKGROUND OF THE INVENTION

Field of the Invention

The present invention relates to a secure data storage device, and more particularly to a secure data storage device that allows reading and writing operations and the methods thereof.

Description of the Related Art

Non-volatile memory or non-volatile storage is a computer memory which retains stored information even when it is not powered. Examples of non-volatile memory include read-only memory, flash memory, ferroelectric RAM (F-RAM), and different types of magnetic computer storage devices such as hard disks, floppy disks, magnetic tape, and optical discs. Non-volatile memory is typically used for long-term persistent storage.

Flash memory devices are electronic non-volatile computer storage media that allow accessing or reading stored data, writing new data and erasing stored data. In recent years, due to the overwhelming advantage of large memory size and high rewriting speed, flash memory has played a major role in the non-volatile memory market. Flash memories are used in a variety of applications, for example in USB drives for personal information storage, or embedded in credit cards or gift cards to enable financial payments or transactions.

Flash memory technology allows writing the value '0' (zero) to any physical bit address in the storage device, and setting the values to '1' (one) when erasing a block which includes a plurality of bits. The stored data remains intact between instances of device usage. However, tampering with the data stored in the device may be relatively simple, for example by illuminating the storage portion of the device with ultra-violet illumination or x-rays. For some applications, such as financial transactions, it is of significant importance to provide secure storage devices that cannot be easily tampered with. Such tampering may alter the stored data to facilitate fraud, e.g. a pre-paid gift card which has been tampered with may show a remaining positive amount of money (on the flash storage device), while the actual balance is zero.

It is desirable to provide a secure storage device, for example flash-memory based, which allows efficient storing and rewriting of data on the secure device, while improving the security and integrity of the data, and prevents tampering with the data stored in the device.

BRIEF SUMMARY OF THE INVENTION

A secure data storage device for preventing tampering with data stored thereon is provided according to embodiments of the disclosed subject matter. The secure data storage device comprises a two-dimensional memory array for storing data, for example a flash memory array, the array comprises a predetermined number of data words. Each data word may include a set of bits, and may be associated with a single physical address in the memory array.

A key storage area for storing a key of the data storage device is included in the secure data storage device. In some embodiments, the key storage area is a predetermined portion of the memory array, while in other embodiments the key storage area is a storage area separate from the memory array. The key stored in the key storage area may be a unique key, e.g. customized for each specific data storage device.

The secure data storage device further comprises an address conversion unit configured to convert a logical address to a corresponding physical address pointing to a location in the memory array. The conversion is based on a conversion function, at least a portion of the key stored in the key storage area and the logical address.

The secure data storage device further comprises a bit mixing unit for mixing bit values of an input data word to obtain a mixed word value, such that the mixed word value is a rearrangement of the bit values of the input data word. The mixing may be based on a one-to-one mapping function, at least a portion of the key and a logical address of the input data word. The secure data storage device is electrically connectable to a host.

In some embodiments, the bit mixing unit comprises a plurality of multiplexers. Each multiplexer may include a predetermined number of input lines and output lines, and determine which input line value to pass to which output line. Such determination may be performed according to control parameters, which may be based on a key (e.g. a unique key) stored in the key storage area. The control parameters may further be generated based on the logical address or the corresponding physical address.

The data storage device may be electrically connectable to a host or control unit. In some embodiments, the data storage and host are a single physical entity.

Embodiments of the disclosed subject matter include a method of writing data to a secure data storage. The secure data storage comprises a memory array and a key stored therein, and is electrically connectable to a host. The method includes receiving a write command from the host electrically connected to the secure data storage device, the write command including a logical address of a data word and an input data word, and converting the logical address to a corresponding physical address in the memory array, based on the logical address and based on at least a portion of the key. The conversion is performed based on a predetermined conversion function. The method further comprises calculating a mixed word value based on the logical address and based on at least a portion of the key. The mixed word value is calculated by rearranging the bit values within the input data word. The method includes writing the mixed word value to a location in the memory array according to the calculated physical address.

Embodiments of the disclosed subject matter include a method of reading data from a secure data storage, in which the secure data storage comprises a memory array and a key stored in the secure data storage, and the secure data storage is electrically connectable to a host. The method includes receiving a read command from the host electrically connected to the secure data storage device, in which the read command includes a logical address of a data word, and converting the logical address to a corresponding physical address in the memory array. The conversion is based on the logical address and based on at least a portion of the key, and is performed according to a predetermined conversion function. The method further includes reading a mixed word value from a location in the memory array according to the calculated physical address, and generating an output word value based on the logical address and based on at least a portion of the key. Generating the output word value comprises rearranging the bit values of the mixed word value to obtain an un-mixed data. The output word value is then provided to the host.

BRIEF DESCRIPTION OF THE DRAWINGS

Some non-limiting exemplary embodiments or features of the disclosed subject matter are illustrated in the following drawings.

References to previously presented elements are implied without necessarily further citing the drawing or description in which they appear.

Figure 1A:
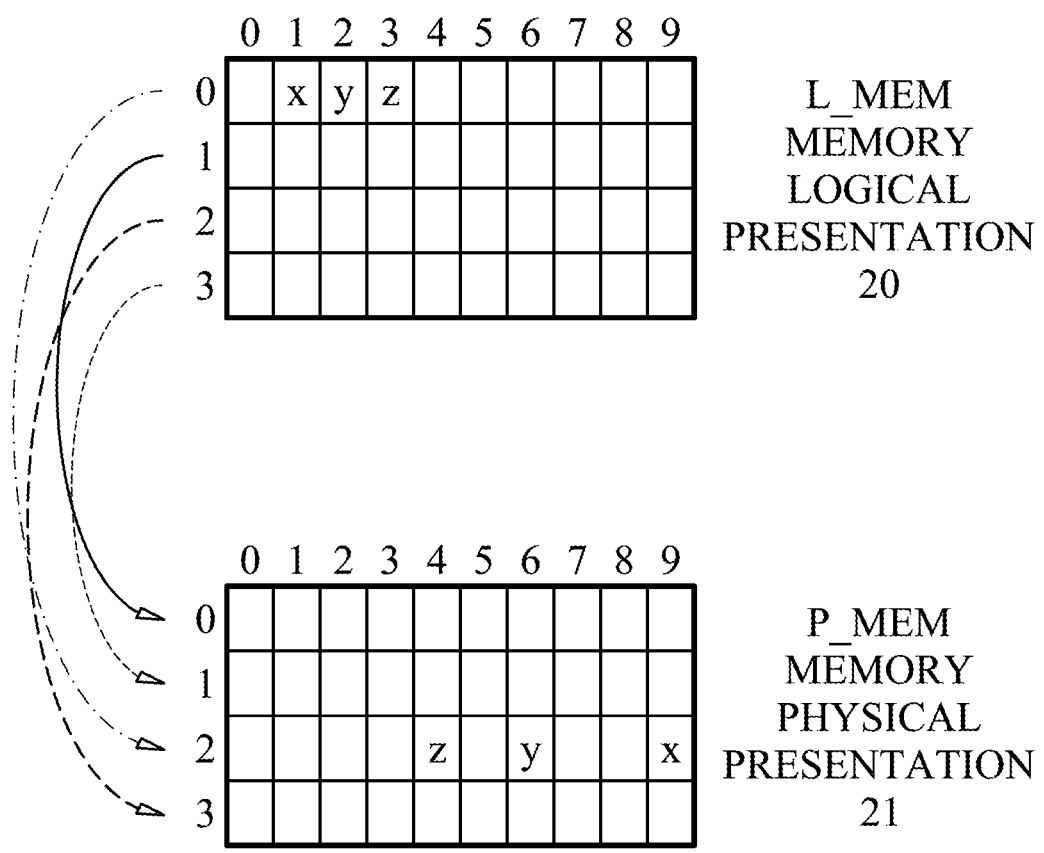
FIG. 1A shows a schematic mapping of logical addresses of a two-dimensional memory array to physical addresses of a two-dimensional memory array according to embodiments of the disclosed subject matter.

It will be appreciated that for simplicity and clarity of illustration, elements shown in the figures have not necessarily been drawn to scale. For example, the dimensions and/or aspect ratio of some of the elements may be exaggerated relative to other elements for clarity. Further, where considered appropriate, reference numerals may be repeated among the figures to indicate corresponding or analogous elements throughout the serial views.

DETAILED DESCRIPTION OF THE INVENTION

In the context of the present disclosure, without limiting, various aspects of the present invention will be described. For purposes of explanation, specific configurations and details are set forth in order to provide a thorough understanding of the disclosed subject matter. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise computers or processors selectively activated or reconfigured by a computer program stored in the computers. Such computer programs may be stored in a computer readable storage medium, such as, but is not limited to, any type of disk including floppy disks, optical disks, CD-ROMs, magneto-optic disc, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus. It will be appreciated that a variety of programming languages may be used to implement the teachings of the invention as described herein.

Embodiments of the invention may include an article such as a computer or processor readable medium, or a computer or processor storage medium, such as a memory, a disk drive, or a flash memory to encode, include or store instructions, e.g., computer-executable instructions, which when executed by a processor or controller, carry out methods disclosed herein.

A characteristic feature of non-volatile memory devices (such as flash memory technology) is that writing a certain bit value (e.g. '0') may be simpler than writing the other bit value (e.g. '1') to the memory device. For example, flash memories enable a single efficient writing direction, e.g. efficient writing of the value '0' (zero) to any physical address in the storage device. However, writing the value '1' to a bit in the memory device is less efficient than writing '0', and requires copying the data which is written in a memory block which contains the bit that requires change and a plurality of additional bits, erasing or resetting the whole block in the memory device, and additionally, rewriting the erased block with the original data for the bits that haven't changed and with the new data for one or more bits that were changed from '0' to '1'. Thus, flash memory or storage devices are characterized by having one efficient writing direction and one less-efficient or inefficient writing direction. In another example writing the value '1' to certain memory devices which have a single efficient writing direction may be performed more efficiently than writing the value '0'.

In applications that require performing multiple writing operations that change the data mostly or only in a single direction, which is the efficient direction (e.g. the data bit values are typically changed from '1' to '0', and rarely or never changed from '0' to '1'), it is advantageous to maintain the flash memory characteristic of writing data only in the efficient direction. This may speed up the transactions, and prevent the need for a large memory unit.

However, in order to prevent fraud and tampering with the data stored in the device, it is desirable to secure the data stored thereon. Various encryption methods are known in the art. For example, the RSA algorithm is a public-key encryption method which includes a public encryption key and a secret decryption key. The Advanced Encryption Standard (AES) is a specification for encryption of electronic data using a symmetric key algorithm, established by the U.S. National Institute of Standards and Technology (NIST) in 2001 and based on the Rijndael cipher. These and other encryption methods change the data values that are stored in the memory, and the encrypted data must be decrypted back to plain text when the text is read. Thus, a memory block that contained a specific number of '0' bit values and '1' bit values, is changed after encryption to include a different number of '0' bit values and '1' bit values which must be stored in the memory. As explained above, frequent changes of data in one direction (e.g. '1' to '0') may be efficient, but data changes in the other direction (e.g. '0' to '1') may be inefficient, cumbersome, and may require more time to perform a single transaction.

A technical problem dealt with by the present disclosure is related to the difference between input data values and encrypted data values. A "data word", when used in the context of this application, is a term for the basic unit of data used by a processor or computer. A data word is a group of bits or digits of a fixed size (e.g., binary or decimal) that are handled as a single unit by the instruction set or the processor hardware. The number of bits (or digits) in a word is referred to as the word size or word length. The size of a word is reflected in many aspects of a computer's structure and operation. For example, most registers in a processor are usually word-sized and the largest piece of data that can be transferred to and from the working memory in a single operation is a word in many (not all) architectures. Processors typically have a word size of 8, 16, 24, 32, or 64 bits. In some examples, more than one word size may be used by a processor or a storage device.

A "word value", when referred to herein, is the actual digit value of a certain data unit or data word of a predetermined length, stored in a memory unit. A "bit value" is the actual binary value of a certain bit stored in a memory unit. When encrypting data, e.g. using one of the above encryption methods, the encrypted data values of each data word are typically very different from the input (plain text or unencrypted) data word values. For example, referring to binary data, if we count the number of '0' (zero) values and the number of '1' (one) values in a data word received as input to an encryption function, and the encrypted data word output from the encryption function, the values would be very different. Even if the changes to the input data values are minor, the changes to the encrypted data values are significant, and when writing the encrypted data values to a storage unit, it requires re-writing or changing more bit values than would be required if the plain text data values were written. In order to take advantage of the flash memory characteristics, it is desirable to provide a method for securing the stored data without changing the bit values of the data.

The present subject matter discloses a method for mixing the input data values without changing the bit values. For example, an input word value of '1110' may be mixed to '1011', '1101', '1110' or '0111'.

It is an object of the disclosed subject matter to present a device and method which enable writing data securely to a storage device having a single efficient writing direction. The secure writing is performed by mixing the input data without changing the data bit values, and specifically without requiring to write values to the storage device in the inefficient writing direction. The device and method allow writing additional data (in the efficient direction) to the storage device, for example as long as there are still data bit values in the storage device which have not been changed (e.g., have not been over-written in the efficient direction). For example, a secure storage device which is initiated to store data comprising only bit values of '1', may allow changing each stored data word, the change being in the efficient writing direction (from '1' to '0' in this example), as long as not all the bit values equal '0'. In another example, a secure data storage device which has an efficient writing direction from '0' to '1', and is initiated to store data values comprising only '0', may allow changing each stored data word, the change being in the efficient writing direction, as long as not all the bit values of the stored data word equal '1'.

Embodiments of the present invention include a secure non-volatile data storage unit, which stores the original data values (e.g., non-encrypted data values) in a secure manner. A first phase may include data address conversion, to eliminate a correlation between a logical address and the actual physical address of a data word in a secure data storage device. A second phase includes data mixing, to scramble the bit values within a certain data unit without changing the bit values.

According to embodiments of the present invention, a data storage unit may include for example, a two-dimensional memory array, e.g. a table represented by rows and columns. The array includes a predetermined number of rows (or data words). Each word in the array has a predetermined size (or number of bits), e.g. 8 bit, 32 bit, 64 bit or 128 bit, and the size of the word equivalent to the number of columns in the two-dimensional array. In some embodiments, the array may include words in more than one word size, e.g. one portion of the array may have a first word size, and another portion of the array may have a second word size. Each word is associated with a single physical location in the memory array, referred to as a physical address. The physical address of a word is the actual (physical) location of that data word stored in the memory array. The physical address of a word is the location accessed by the memory unit hardware, when reading data stored in the device or writing data to a given logical address. The data word includes a set of bits, e.g. a fixed number of bits, and each data bit within a data word is associated with a physical bit position within the physical address of the data word.

A given physical address in a memory unit stores a word value, which is the actual binary value or digit value.

Reference is made to FIG. 1A, which shows a schematic mapping of logical addresses of a two-dimensional memory array to physical addresses of a two-dimensional memory array according to embodiments of the disclosed subject matter. A memory array MEM may be defined as a table of 4 rows (words), each word being 10-bit long. A logical address of the first word in the memory array may be denoted as L_MEM[0], and the logical bit position of, for example, the second bit in the first word may be denoted as L_MEM[0,1]. Three bit values are shown in the logical representation 20 of MEM array: L_MEM[0, 1]=x; L_MEM[0, 2]=y; and L_MEM[0, 3]=z.

Each word (or row) in L_MEM logical representation 20 is mapped to a different row in the physical representation 21. For example, the first row (denoted L_MEM[0]) in logical representation 20 is mapped to the third row in physical representation 21 (denoted P_MEM[2]). The second row (denoted L_MEM[1]) in logical representation 20 is mapped to the first row (denoted P_MEM[0]) in physical representation 21.

Furthermore, each bit in a row of the logical representation 20 may be mapped to a different bit position in the physical representation 21. For example, the bit positioned in L_MEM[0,1] of logical representation 20 which has the bit value x is mapped to position P_MEM[2,9] in physical representation 21. Bit L_MEM[0,2] of logical representation 20 which has the bit value y is mapped to position P_MEM[2,6] in physical representation 21. As a result, the words (rows) in physical representation 21 are mixed, and the bit values (within each word) are mixed as well, but the data values within each word, and within the whole memory unit, remain unchanged.

Figure 1B:
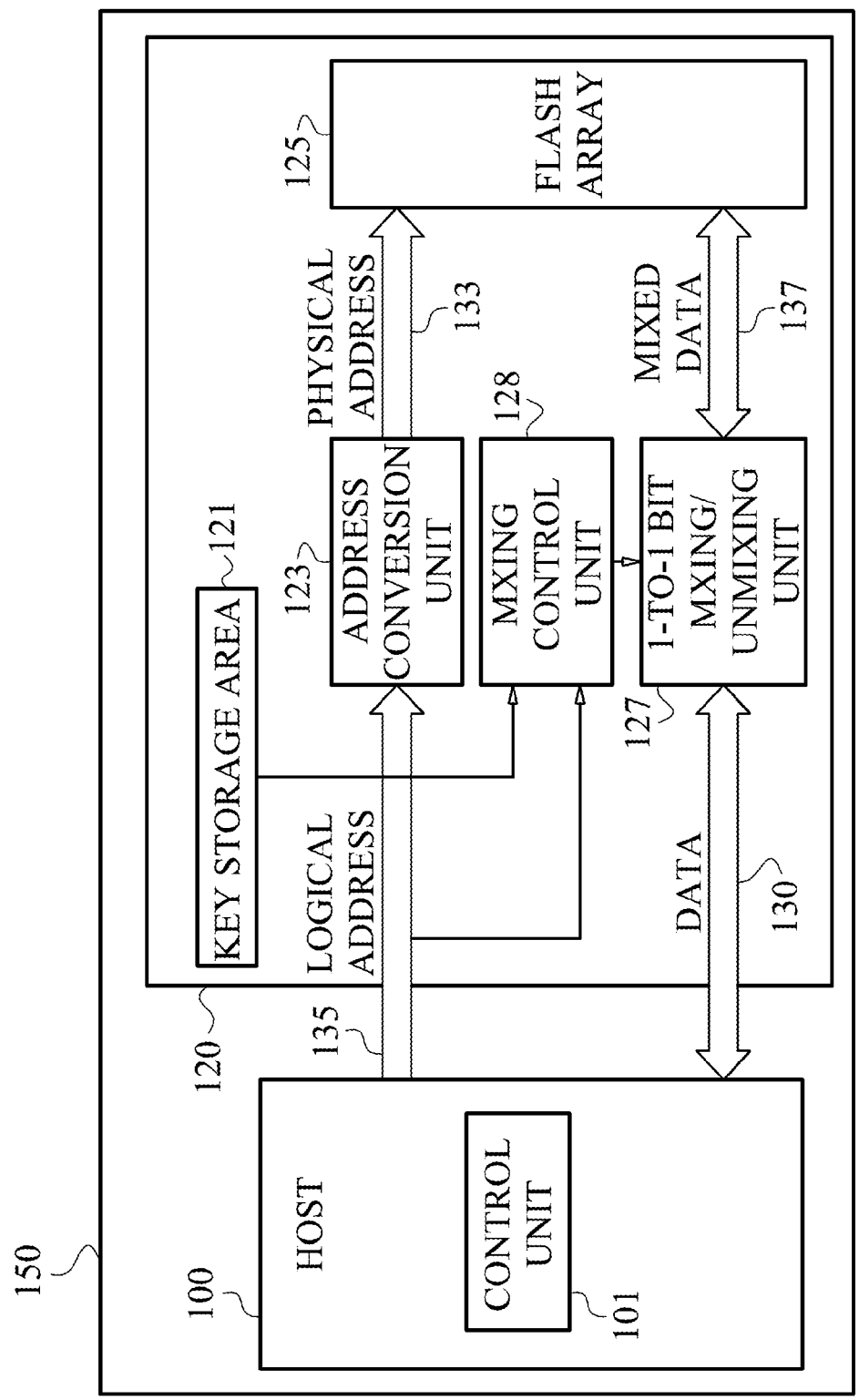
FIG. 1B schematically illustrates a secure data storage system according to embodiments of the disclosed subject matter.

Reference is now made to FIG. 1B, which schematically illustrates a secure data storage system according to embodiments of the disclosed subject matter. The data storage system 150 includes a secure data storage device 120. The secure data storage device 120 includes a two-dimensional memory array 125, for example a flash memory array or other non-volatile memory array arranged in a two-dimensional structure. Each word (or row) in the two-dimensional memory array 125 is associated with physical address, and the word value is stored in the corresponding physical address. Each word includes a set of bits, e.g. fixed number of bits, and in some embodiments, each bit and/or word may be accessed separately (e.g. for reading or writing) by a host 100 or an external control unit.

The secure data storage device 120 may include a key storage area 121 which is a predetermined storage area dedicated to store a key. The key may be or may include a string of characters, e.g. alphanumeric characters, binary characters, digits, etc. In one embodiment, key may be, for example, 128 bits long. The key, or portions thereof, may be used as one or more keys for mixing and securing the stored data according to embodiments detailed herein. The key storage area 121 may be a separate storage area in secure data storage device 120, and/or may be a predetermined fixed address in two-dimensional memory array 125.

The secure data storage device 120 includes an address conversion unit 123, which receives a logical address from a host 100, and converts the logical address to a corresponding physical address pointing to a location in two-dimensional memory array 125. In the context of the present disclosure, a logical address is a memory address which corresponds to a single physical address of a word (or row or data unit) in the two-dimensional memory array 125. The logical address is converted to the corresponding physical address by the address conversion unit 123, based on, for example, the given logical address, at least a portion of key stored in key storage area 121, and a predetermined conversion function. Any known encryption/decryption algorithms or methods (or combination of algorithms or methods) may be used to implement the conversion function, for example, XOR (which operates according to the exclusive disjunction operation), LFSR (linear feedback shift register), AES, DES (Data Encryption Standard), SHA (Secure Hash Algorithm) and/or RSA. Other methods of mixing, conversion, mapping or encryption may be used, to obtain a physical address which has no correlation to the logical address it is associated with. The physical address computed by address conversion unit 123 is sent via interface 133 to two-dimensional memory array 125, to facilitate a read, write or erase operation therein.

The secure data storage device 120 includes a bit mixing unit 127 for mixing bit values of an input data word to obtain a mixed word value within a mixed data word. The mixed word value is stored in two-dimensional memory array 125, in the physical address obtained from a logical address by the address conversion unit 123. The bit mixing operation is performed according to control parameters provided by a mixing control unit 128, in which the control parameters are provided based on at least a portion of the key stored in key storage area 121, and the logical address of the input data. The bit mixing unit 127 does not change the bit values within a data word, but rather mixes or rearranges the values within the data word. Thus, the total number of bit values in the mixed data word that equal '0' (zero) and total number of bit values in the mixed data word that equal '1' is equivalent to the total number of bit values in the input data word (in plain text) that equal '0' values and total number of bit values in the input data word that equal '1'. The mixed word value is passed from the bit mixing unit 127 for storage in the two-dimensional memory array 125, through data interface 137, and from the two-dimensional memory array 125 to the bit mixing unit 127, e.g. when a host device such as the host 100 initiates a "read" command. When the host 100 initiates a "read" command, the mixed data word is un-mixed by the bit mixing unit 127, to obtain the original or plain text word value. The plain text word value is then sent via a data interface 130 to the host 100. Similarly, when the host 100 initiates a "write" command with an input data word (sent, for example, via the interface 130), the input word value is mixed by the bit mixing unit 127, and a mixed word value is sent via the data interface 137 for storage in the memory array 125. The host 100 may initiate an "erase" command to erase or reset a memory area within the secure data storage device 120. The erase command may include a logical address and an area size to erase.

In some embodiments, the address conversion unit 123 associates a logical address to a physical address based on a first portion of the key, and the bit mixing unit 127 mixes the bit values of the input data word based on a second portion of the key.

The secure data storage system 150 includes the secure data storage device 120 and the electrically connectable host 100. In some embodiments, the host 100 may be an external processor or external computer which is operationally and electrically connectable to the secure data storage device 120. In other embodiments, the host 100 may be integrated or included within the secure data storage device 120, for example both the host 100 and the secure data storage device 120 may reside is a single physical unit. An address interface 135 which connects host 100 to the secure data storage device 120 allows a logical address to be received by the secure data storage device 120, for example by the address conversion unit 123 of the secure data storage device 120.

Figure 2:
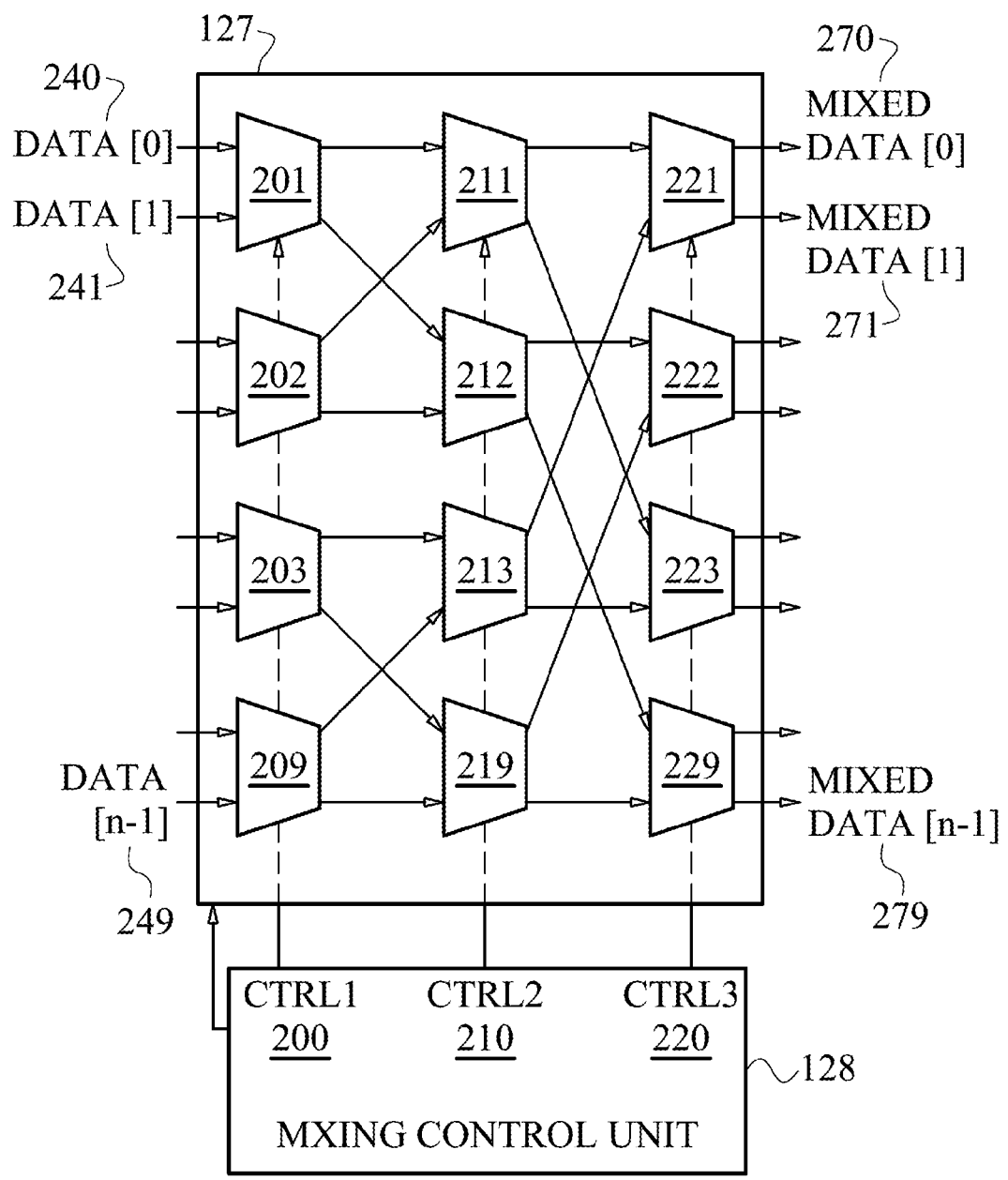
FIG. 2 illustrates a bit mixing unit, according to exemplary embodiments of the disclosed subject matter.

Reference is now made to FIG. 2, which illustrates an exemplary bit mixing unit 127 of a secure data storage device, according to exemplary embodiments of the disclosed subject matter. The bit mixing unit 127 receives input of N bit values 240-249, N being a natural number larger than 1, and provides an output of N mixed data values 270-279 which are a permutation or rearrangement of the N input bit values.

The bit mixing unit 127 implements a one-to-one mapping function, which receives an input of control parameters and an input word value, and returns a data word output of an equal size to the input data word, with the same bit values provided in the input data word, in a scrambled, rearranged or mixed order within the output data word. Each input bit value of an input data word is output through a single exit line of the bit mixing unit 127.

The bit mixing unit 127 may be implemented according to methods known in the art for mixing or rearranging data values. In some embodiments, the bit mixing unit 127 may include a plurality of multiplexers or hash units 201-209, 211-219 and 221-229. Each multiplexer may include, in one example, a fixed number of input lines and an equal number of output lines. A single bit value may be passed along each line. Each multiplexer determines which input line to pass to which output line. A multiplexer may receive input of, for example, two bit values, and output two bit values either in a mixed manner or with no change to the input. Each multiplexer mixes the input bits, according to the control parameters provided to the bit mixing unit 127.

One or more control parameters (e.g. parameters 200, 210 and 220) are received by the bit mixing unit 127, from the mixing control unit 128 which is connected to the key storage area 121 and to the address interface 135. The control parameters are calculated in the mixing control unit 128 based on the key stored in the key storage area 121 and based on the logical address of the input data word. The same control parameter may be used for a plurality of multiplexers, for example, each of multiplexers 201-209 receives control parameter 200, each of multiplexers 211-219 receives control parameter 210, and similarly each of multiplexers 221-229 receives control parameter 220. A different number of control parameters may be used, for example a different control parameter may be used for each multiplexer. The number of possible permutations of the input data values depends on the number of control parameters that are provided to the bit mixing unit 127. Thus, the number of control parameters correlate to the level of data security provided by the mixing operation.

Each bit of an input data word, which originally resides in a certain bit position within the input data word, is mapped to a new position in the mixed data word which is stored in the physical memory. The data values of each word are stored in the memory array in a mixed manner, which depends both on the input logical address and on one or more control parameters derived from the key. As a result, any attempt to tamper with the stored data requires knowledge of the control parameters and the mixing operation, making the tampering process both difficult and time consuming.

In some embodiments, each secure data storage device may receive a unique or customized key, and in these cases finding the control parameters to a first secure data storage device does not provide any benefit when attempting to tamper with a second secure data storage device having a different key value.

Figure 3A:
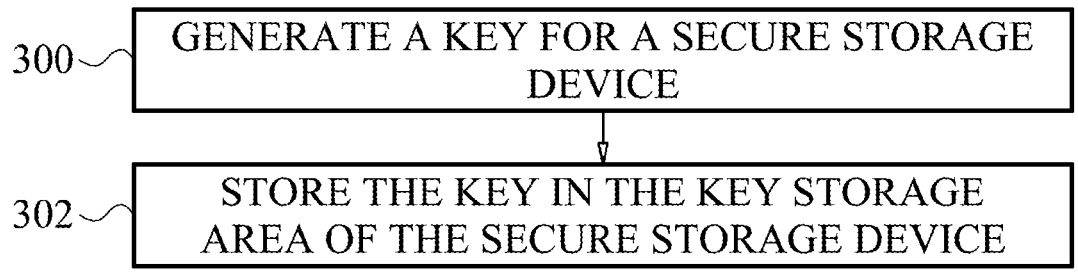
FIG. 3A is a flow chart of a method for generating and storing a key in a secure data storage device according to embodiments of the disclosed subject matter.

Reference is made to FIG. 3A, which is a flow chart of a method for generating and storing a key for a secure data storage device according to embodiments of the disclosed subject matter. A key may be generated in operation 300. In some embodiments, the key is a unique key which is generated separately per each secure data storage device. In other embodiments, the same key may be used for a plurality of secure data storage devices. The key is of a predetermined size (number of bits), e.g. 128 or 256 bit long. Other sizes may be used. Various random key generators may be used.

Once the key is generated, it is stored in the key storage area of the secure storage device in operation 302. Typically, a host device which is operationally connected to the secure data storage device (e.g. external to the secure storage device or included therein) obtains or generates the key, then stores it in the key storage area.

Figure 3B:
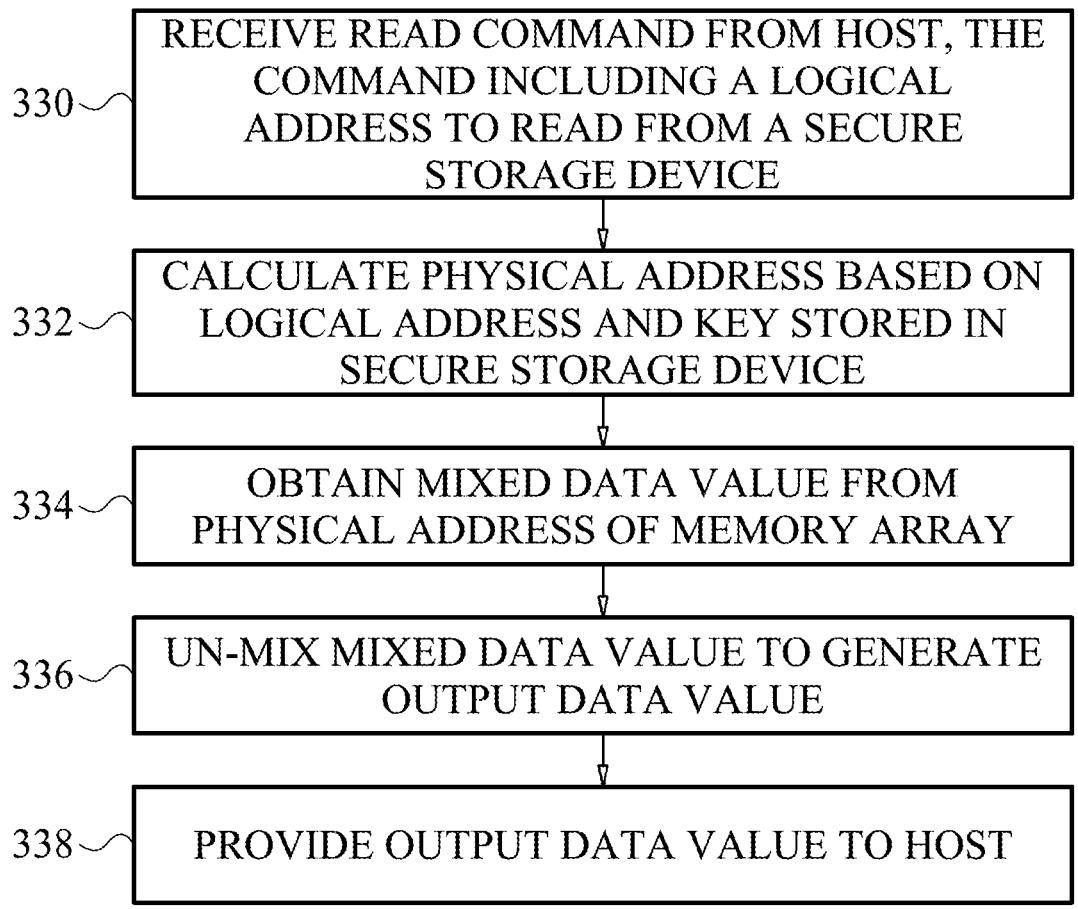
FIG. 3B is a flow chart of a method for reading data from a secure data storage device according to embodiments of the disclosed subject matter.

FIG. 3B is a flow chart of a method for reading data from a secure data storage device according to embodiments of the disclosed subject matter. In operation 330, the secure data storage device receives a "read" command sent by a host device, in which the command including a logical address corresponding to a word stored in a secure storage device.

The logical address is converted to a physical address in a memory array of the secure data storage device in operation 332, e.g. by an address conversion unit included in the secure data storage device, such as address conversion unit 123 of FIG. 1B. The conversion is based on the logical address and a key (or a portion thereof) stored in a dedicated key storage area of the secure storage device (e.g., in key storage area 121). The conversion of the logical address to a physical address is performed using a predetermined conversion function, e.g. a known encryption function, which may be stored, for example, in the address conversion unit. The conversion function eliminates a correlation between the logical address and the physical address in the memory array.

In operation 334, a mixed data value is obtained from the memory array according to the calculated physical address. The mixed data value is passed to a bit mixing/un-mixing unit which generates, in operation 336, an output value which is the un-mixed or plain text word value. The mixing/un-mixing operation is based on the input logical address, and one or more control parameters which are derived from at least a portion of the key stored in the key storage area of the secure storage device. The mixing/un-mixing operation is performed for example, by a bit mixing unit which is included in the secure data storage device (such as unit 127 of FIG. 1B). The bit mixing unit may be implemented by a plurality of multiplexers, which receive an input of a fixed number of data bits and control parameters, and provide an output of the same number of bits in a mixed or rearranged manner.

In operation 338, the output data value is provided to the host device that generated the "read" command, e.g. through a data interface which electrically and operationally connects the host device to the secure storage device.

Figure 3C:
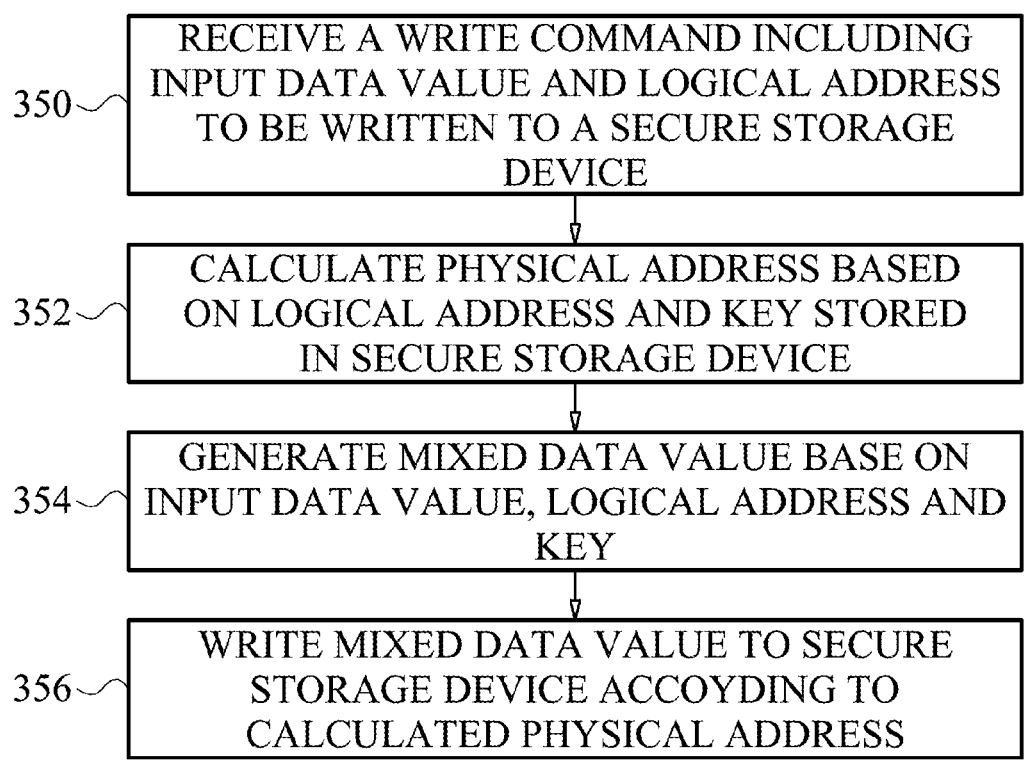
FIG. 3C is a flow chart of a method for writing data to a secure data storage device according to embodiments of the disclosed subject matter.

FIG. 3C is a flow chart of a method for writing data to a secure data storage device according to embodiments of the disclosed subject matter. In operation 350, a "write" command may be sent from a host device which is electrically and operationally connected to the secure data storage device, the write command including an input word value to be stored in the secure data storage device and a logical address.

In operation 352, a physical address is calculated based on the logical address and a key (or a portion thereof) stored in the key storage area (e.g. key storage area 121 of FIG. 1B) of the secure storage device. The physical address is calculated by an address conversion unit (e.g. address conversion unit 123 of FIG. 1B), which stores a predetermined address conversion function that is used to convert the logical address to the corresponding physical address.

In operation 354, a mixed word value is generated by a bit mixing unit (e.g. bit mixing unit 127 of FIG. 1B), based on the input word value, control parameters derived from the key or from a portion thereof, and the logical address provided as input. The bit mixing operation may be implemented as a one-to-one mapping function that generates a permutation or rearrangement of the bit values of the input data word, while maintaining the same bit values of the input data. The bit mixing unit may include, in one embodiment, a plurality of multiplexers, each multiplexer receiving a fixed number of input bit values, and generating an output that includes the same bit values in a mixed or rearranged order.

In operation 356, the mixed word value is written to the location pointed to by the physical address (as calculated in operation 352) in a two-dimensional memory array included in the secure data storage device.

As used herein the term 'configuring' and/or 'adapting' for an objective, or a variation thereof, implies using components in a manner and/or mechanism designed for achieving the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A secure data storage device for preventing tampering with data stored thereon, comprising:
   a two-dimensional memory array for storing data, the array comprising a predetermined number of data words, each data word comprising a set of bits, each data word associated with a single physical address in the memory array;
   a key storage area for storing a key of the data storage device;
   an address conversion unit for converting a logical address to a corresponding physical address pointing to a location in the memory array, said converting based on a conversion function, at least a portion of the key stored in the key storage area and the logical address; and
   a bit mixing unit for mixing bit values of an input data word to obtain a mixed word value, such that the mixed word value is a rearrangement of the bit values of the input data word, said mixing based on a one-to-one mapping function, at least a portion of the key and the logical address of the input data word;
   wherein said device is electrically connectable to a host to receive the logical address.

2. The data storage device according to claim 1, wherein the address conversion unit associates the logical address to the physical address based on a first portion of the key, and the bit mixing unit mixes the bit values based on a second portion of the key.

3. The data storage device according to claim 1, wherein the key storage area is a predetermined portion of the memory array.

4. The data storage device according to claim 1, wherein the key storage area is a storage area separate from the memory array.

5. The data storage device according to claim 1, wherein the memory array is a flash memory array.

6. The data storage device according to claim 1, wherein the bit mixing unit comprises a plurality of multiplexers, each multiplexer having a predetermined number of input lines and output lines, each multiplexer determining which input line to pass to which output line, each determination based on control parameters obtained from a key stored in the key storage area.

7. The data storage device according to claim 6 wherein the control parameters are further based on the logical address or the corresponding physical address.

8. The data storage device according to claim 1, wherein the key is a unique key customized for each specific secure data storage device.

9. The data storage device according to claim 1, wherein the host is external to the secure data storage device.

10. A method of writing data to a secure data storage comprising a memory array and a key stored in said secure data storage, said secure data storage electrically connectable to a host, the method comprising:
    receiving a write command from the host electrically connected to the secure data storage device, said write command including a logical address of a data word and an input data word;
    converting the logical address to a corresponding physical address in the memory array, based on the logical address and based on at least a portion of the key, wherein said converting is based on a predetermined conversion function;
    calculating a mixed word value based on the logical address and based on at least a portion of the key, wherein said calculating comprises rearranging the bit values within the input data word; and
    writing the mixed word value to a location in the memory array according to the calculated physical address.

11. The method according to claim 10, wherein calculating the mixed word value is performed using a plurality of multiplexers, each multiplexer having a predetermined number of input lines and output lines, the method comprising determining which input line to pass to which output line according to control parameters which are based on the key stored in a key storage area of the secure data storage.

12. The method according to claim 11, comprising calculating the control parameters based on the logical address or the corresponding physical address.

13. The method according to claim 10, comprising storing a unique key customized for each specific secure data storage.

14. A method of reading data from a secure data storage comprising a memory array and a key stored in said secure data storage, said secure data storage electrically connectable to a host, the method comprising:
    receiving a read command from the host electrically connected to the secure data storage, said read command including a logical address of a data word;
    converting the logical address to a corresponding physical address in the memory array, based on the logical address and based on at least a portion of the key, wherein said converting is performed according to a predetermined conversion function;
    reading a mixed word value from a location in the memory array according to the calculated physical address;
    generating an output word value based on the logical address and based on at least a portion of the key, wherein said generating comprises rearranging the bit values of the mixed word value to obtain un-mixed data; and
    providing the output word value to the host.

* * * * *